Sept. 20, 1960  W. HORBERG  2,953,417
PRECISION ADJUSTABLE BEARING STRUCTURE
Filed July 31, 1958
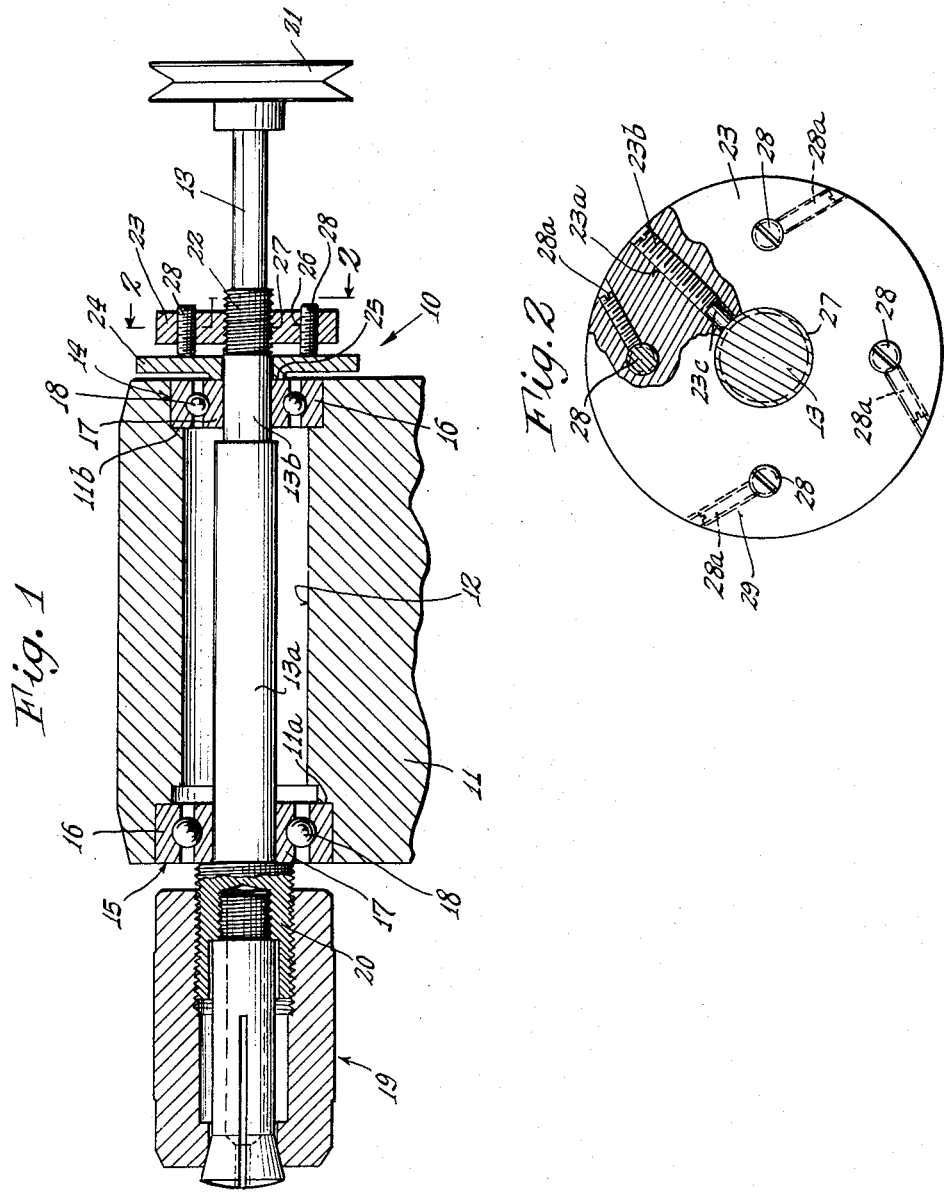
INVENTOR.
William Horberg
BY
Johnson and Kline
ATTORNEYS

United States Patent Office 2,953,417
Patented Sept. 20, 1960

2,953,417

PRECISION ADJUSTABLE BEARING STRUCTURE

William Horberg, Trumbull, Conn., assignor to Horberg Grinding Industries, Inc., Bridgeport, Conn., a corporation of Connecticut Filed July 31, 1958, Ser. No. 752,359

12 Claims. (Cl. 308—189)

This invention relates to improvements in bearing structures and, more specifically, to radial and thrust bearings and preloading and precision aligning means therefor.

Heretofore, in devices which embody radial and/or thrust bearings, the problem has been presented of eliminating radial and axial shaft play, vibration and noise without increasing the cost, size or weight of the finished product. The prior art has attempted to solve these problems by utilizing packing, machining the parts to very close tolerances and by resorting to complicated preloading and aligning means, with a minimum of success; most of these methods failed to achieve their desired result, and those that did increased the cost of manufacture a prohibitive amount.

Accordingly, it is an object of the invention to provide a simple bearing structure which, in operation, is free of destructive shaft play and vibration and of disturbing noises.

It is also an object of the invention to provide a simple, inexpensive bearing structure which may readily be preloaded and precision aligned, for use in a variety of devices.

It is also an object of the invention to provide a self-contained bearing structure, wherein the bearing means, which are mounted on a rotatable member, are adjustably precision aligned and preloaded.

Another object of the invention is to provide a bearing structure having bearing means, including inner and outer races, and means for canting the bearing means relative to the rotatable member on which it is mounted for precision aligning and preloading the structure.

Still another object of the invention is to provide a bearing structure, including a rotatable member, bearing means having inner and outer races, a stationary support member adapted to seat the bearing means and means operably connected to the rotatable member for canting the bearing means relative thereto so that the bearing structure is preloaded and the bearing means is aligned with the stationary support.

Yet another object of the invention is to provide in a bearing structure, having a rotatable member, bearing means mounted thereon and a stationary support, means adjustably mounted on the rotatable member for canting the bearing means relative thereto for preloading the structure and accurately aligning the bearing means with the stationary support.

It is further an object of the invention to provide a precision adjustment assembly for use in a bearing structure, having a rotatable member, bearing means mounted thereon and a stationary support, which includes a thrust plate slidably mounted on the rotatable member for engaging the bearing means, an adjustment plate adjustably connected to the rotatable member and means between the adjustment plate and thrust plate for shifting the latter to cant the bearing means so that the structure is preloaded and the bearing means is accurately aligned with the stationary support.

It is still further an object of the invention to provide a self-contained, preloaded, precision aligned bearing structure which may readily be manufactured by quantity production methods, is inexpensive and of such rugged character it will function over long periods of time with freedom from all difficulties.

With these and other objects in mind, reference is had to the attached sheet of drawings, illustrating one form of the invention, wherein like characters represent like parts, and in which:

Figure 1 is a fragmentary view, partially in section, illustrating a device embodying the invention, and Fig. 2 is a view, partially broken away and in section, taken in the direction of the arrows 2—2 in Fig. 1.

The invention, which is a self-contained bearing structure including preloading and precision aligning means, contemplates providing, in cooperation with the preloading member of the structure, means for canting the bearing means relative to the rotatable member for accurately aligning the same with the stationary support. The concepts, which are basic to the invention, are applicable to substantially all bearing structures in which a shaft or similar rotatable member is carried by a stationary support and mounts a bearing means, of a type which includes an inner and outer bearing race.

Referring now to the drawings for a detailed description of the invention, a bearing structure, generally indicated by the numeral 10, is illustrated for purpose of description only, in the driving head of a lathe. A stationary support member 11, which may form the driving head housing of a lathe or a portion of the lathe frame, is provided with a bore 12 adapted to loosely ensleeve a rotatable member 13. The rotatable member, which is here shown as a shaft of steel or similar material adapted to serve a particular purpose, slidably frictionally mounts a pair of spaced bearing means 14 and 15 of the type that include inner and outer bearing races 17 and 16, respectively. While the invention is applicable to any bearing means having an inner and outer race, including those having tapered and roller bearings, etc., in the illustrated form of the invention ball bearings 18 are illustrated as riding the raceways between the inner and outer races. It will be noted that bearing means 15 is substantially larger than bearing means 14, however, it will be understood that such a difference in bearing size is related to the function of the bearing structure as a whole and is not an inherent requirement of the invention. As will be clearly understood by those versed in the art, shaft 13 is of stepped construction to accommodate the bearing means of different diameters; bearing means 15 is mounted on a portion 13a of large diameter and bearing means 14, is mounted on a shaft portion 13b of reduced diameter. The stationary support 11 is provided with means 11a and 11b for operably seating the bearing means 15 and 14 respectively; the outer race of each of the bearing means is adapted to frictionally engage its respective seat in the stationary support.

Rotatable shaft member 13, which as afore-described, is loosely ensleeved in the bore 12 of stationary support 11, has provided on one end thereof a collet 19 for gripping an article to be machined in the lathe. In accordance with conventional practice the end of shaft 13 is formed with an enlarged threaded head 20 which forms an operable part of the collet and abuts the inner race 17 of one of the bearing means. The bearing means 15, which is of large size to withstand excess radial pressures is engaged by head 20 at its inner race, is retained against outward longitudinal movement with respect to shaft 13 thereby and in its seat 11a in support member 11. A drive pulley 21 or similar means is mounted on the end of shaft 13 directed away from collet 19, for operably linking the shaft to a conventional source of power (not shown).

It is contemplated that shaft 13 will be provided, along a portion of its length, with threads 22 adapted to adjustably engage an adjustment plate 23 through a threaded bore 27 therein. A bore 23a may be formed in adjustment plate 23 to extend radially outwardly from threaded bore 27 for receiving a set screw 23b or similar locking means. In accordance with well known practice, a bronze or other soft metal plug 23c may be slidably disposed in bore 23a between set screws 23b and threads 22 or shaft 13 for preventing damage to the threads as the set screw is drawn into locking position.

Between adjustment plate 23 and bearing means 14, a disk-shaped thrust plate 24 is slidably frictionally mounted on the shaft for engaging the inner race 17 of the bearing means. In order to facilitate the engagement of the thrust plate with the inner race of the bearing means and to space the thrust plate from the outer race 16 of bearing means 14 and stationary support 11, an integral axially extending neck portion 25 is formed on the thrust plate. The adjustment plate 23, which is adapted to be adjustably threaded toward and away from thrust plate 24 and bearing means 14 is provided with a plurality of threaded bores 26 spaced concentrically around the threaded shaft receiving bore 27 for receiving adjusting screws 28 or similar members. Locking means 28a, here shown in the form of set screws, may be provided in adjustment plate 23 for retaining the adjusting members 28 in adjusted position as will be hereinafter more fully explained. While the locking set screws 28a may be disposed in threaded bores extending radially outwardly from the axis of the adjustment plate, I have found it preferable to offset the set screw receiving bores as indicated at 29 to reduce the effect of centrifugal force thereon.

In the operation of bearing structure 10, the rotatable member 13, which is mounted through bearing means 14 and 15, in bore 12 of stationary support 11, is rotated while a gauge (not shown) of any well known type, is operably engaged with the thrust plate to indicate misalignment of the bearing structure. It will be understood that any misalignment of the bearing means, with respect to the rotatable member or the stationary support, will be transmitted to the thrust plate, which is frictionally mounted on the rotatable member for rotation therewith, and thereafter translated into a waivering of the thrust plate. By means of the gauge the necessary corrections in bearing alignment can be determined. After the necessary corrections have been indicated, the adjustments in bearing alignment may be achieved through the use of the adjustment plate 23 and its associated adjustment members 28. In making the necessary corrections in bearing alignment, the adjustment plate 23 is first moved toward the thrust plate by turning the adjustment plate on threaded portion 22 of the rotatable member; this rough adjustment in the position of the adjustment plate brings adjustment members 28 into engagement with the outer surface of thrust plate 24 and facilitates the later precision adjustment of the bearing means. After the adjustment plate has been positioned, as desired relative to the thrust plate, the lock screw 23b is tightened to lock the adjustment plate with respect to the shaft. Precision adjustment of the bearing means is achieved by manipulating one or a combination of the adjustment members 28 to shift the thrust plate so that the bearing means is canted relative to the rotatable member. In this manner, the bearing structure is preloaded and the bearing means is aligned with the stationary support. The adjustment members 28, as above described are locked in adjusted position by means of set screws 28a and thereafter the bearing structure is operable for the purposes for which it was intended.

Thus, among others, the several objects of the invention as aforenoted are achieved. Obviously, numerous changes in the structure may be resorted to without departing from the spirit of the invention as defined by the claims.

I claim:

1. A precision adjustable bearing structure comprising a rotatable member, bearing means including an inner and outer race mounted on said rotatable member, a stationary support member adapted to seat said bearing means, and means carried by said rotatable member for canting said bearing means relative said rotatable member so that said bearing structure is preloaded and said bearing means is aligned with said stationary support.

2. A precision adjustable bearing structure comprising a rotatable member, bearing means including an inner and outer race mounted on said rotatable member, a stationary support member adapted to seat said bearing means, and means carried by said rotatable member acting on one race of said bearing means for canting said bearing means relative said rotatable member so that said bearing structure is preloaded and said bearing means is aligned with said stationary support.

3. A precision adjustable bearing structure comprising a rotatable member, bearing means including an inner and outer race mounted on said rotatable member, a stationary support member adapted to seat said bearing means, and adjustable means carried by said rotatable member acting on one race of said bearing means for canting the same relative said rotatable member so that said bearing structure is preloaded and said bearing means is aligned with said stationary support.

4. A precision adjustable bearing structure comprising a rotatable member, bearing means including an inner and outer race mounted on said rotatable member, a stationary support member adapted to seat said bearing means and means adjustably carried by said rotatable member and successively acting on portions of one race of said bearing means for canting said bearing means relative to said rotatable member for preloading said bearing structure and aligning said bearing means with said stationary support.

5. A precision adjustable bearing structure comprising a rotatable member, bearing means including an inner and outer race mounted on said rotatable member, a stationary support member adapted to seat said bearing means, a thrust plate slidably frictionally mounted on said rotatable member and engaging said bearing means, an adjustment plate carried by said rotatable member outwardly of said thrust plate and means extending between said adjustment plate and thrust plate for shifting the latter to cant said bearing means so that said bearing structure is preloaded and said bearing means are aligned with said stationary support.

6. A precision adjustable bearing structure comprising a rotatable member, bearing means including an inner and outer race mounted on said rotatable member, a stationary support member adapted to seat said bearing means, a thrust plate slidably frictionally mounted on said rotatable member and engaging one race of said bearing means, an adjustment plate adjustably carried by said rotatable member outwardly of said thrust plate and adjustable means extending between said adjustment plate and thrust plate for shifting the latter to cant said bearing means so that said bearing structure is preloaded and said bearing means are aligned with said stationary support.

7. A precision adjustable bearing structure comprising a rotatable member, bearing means including an inner and outer race mounted on said rotatable member, a stationary support member adapted to seat said bearing means, a thrust plate slidably frictionally mounted on said rotatable member and engaging said bearing means, an adjustment plate adjustably threadedly connected to said rotatable member outwardly of said thrust plate and means movably connected to said adjustment plate and acting on said thrust plate for shifting the latter to cant said bearing means so that said bearing structure is preloaded and said bearing means are aligned with said stationary support.

8. A precision adjustable bearing structure comprising a rotatable member being formed with a threaded portion thereon, bearing means including an inner and outer race mounted on said rotatable member, a stationary support member adapted to seat said bearing means, a thrust plate slidably frictionally mounted on said rotatable member and engaging one race of said bearing means, an adjustment plate mounted on said rotatable member and adjustably engaging said threaded portion outwardly of said thrust plate and a plurality of adjusting members movably circumferentially spaced in said adjustment plate and acting on said thrust plate for shifting the latter to cant said bearing means so that said bearing structure is preloaded and said bearing means are aligned with said stationary support.

9. A precision adjustable bearing structure comprising a rotatable member being formed with a threaded portion thereon, bearing means including an inner and outer race mounted on said rotatable member, a stationary support member adapted to seat said bearing means, a thrust plate slidably frictionally mounted on said rotatable member and engaging said bearing means, an adjustment plate mounted on said rotatable member and adjustably engaging said threaded portion outwardly of said thrust plate and a plurality of spaced adjusting members disposed in said adjustment plate concentric with said rotatable member and adjustably movable in a direction transverse to the plane thereof for shifting said thrust plate to cant said bearing means so that said bearing structure is preloaded and said bearing means are aligned with said stationary support.

10. A precision adjustable bearing structure as in claim 9, and means for positively locking said adjustment plate in adjusted position with respect to said rotatable member.

11. A precision adjustable bearing structure as in claim 9, and radially offset means for positively locking said adjusting members in adjusted position in said adjustment plate.

12. A precision adjustable bearing structure comprising a rotatable member being formed with a threaded portion thereon, a pair of bearing means each including an inner and outer race mounted on said rotatable member, a stationary support member adapted to seat said bearing means, a thrust plate slidably frictionally mounted on said rotatable member and engaging one of said bearing means, an adjustment plate mounted on said rotatable member and adjustably engaging said threaded portion outwardly of said thrust plate and a plurality of spaced adjusting members disposed in said adjustment plate concentric with said rotatable member and adjustably movable in a direction transverse to the plane of said adjustment plate for shifting said thrust plate to cant said one bearing means so that said bearing structure is preloaded and said bearing means are aligned with said stationary support.

References Cited in the file of this patent
UNITED STATES PATENTS

| | | |
|---|---|---|
| 1,881,522 | Guild | Oct. 11, 1932 |
| 1,966,905 | Ruth | July 17, 1934 |
| 2,373,859 | Teaf | Apr. 17, 1945 |
| 2,809,475 | Smith | Oct. 15, 1957 |